United States Patent
Corvinelli et al.

(10) Patent No.: US 10,706,354 B2
(45) Date of Patent: *Jul. 7, 2020

(54) ESTIMATING CARDINALITY SELECTIVITY UTILIZING ARTIFICIAL NEURAL NETWORKS

(71) Applicant: INTERNATIONAL BUSINESS MACHINES CORPORATION, Armonk, NY (US)

(72) Inventors: Vincent Corvinelli, Mississauga (CA); Huaxin Liu, Delta (CA); Mingbin Xu, Mississauga (CA); Ziting Yu, Toronto (CA); Calisto P. Zuzarte, Pickering (CA)

(73) Assignee: International Business Machines Corporation, Armonk, NY (US)

(*) Notice: Subject to any disclaimer, the term of this patent is extended or adjusted under 35 U.S.C. 154(b) by 1098 days.

This patent is subject to a terminal disclaimer.

(21) Appl. No.: 15/148,444

(22) Filed: May 6, 2016

(65) Prior Publication Data

US 2017/0323200 A1    Nov. 9, 2017

(51) Int. Cl.
*G06N 3/02* (2006.01)
*G06N 3/08* (2006.01)
(Continued)

(52) U.S. Cl.
CPC .......... *G06N 3/08* (2013.01); *G06F 16/2453* (2019.01); *G06F 16/24545* (2019.01);
(Continued)

(58) Field of Classification Search
None
See application file for complete search history.

(56) References Cited

U.S. PATENT DOCUMENTS 5,995,957 A    11/1999  Beavin et al.
6,108,648 A    8/2000   Lakshmi et al.
(Continued)

FOREIGN PATENT DOCUMENTS

CN    101599138 A    12/2009

OTHER PUBLICATIONS

Harangsri, Query Result Size Estimation Techniques in Database Systems, Doctoral Thesis, The University of New South Wales, 1998, pp. 1-316 (Year: 1998).*

(Continued)

*Primary Examiner* — Wilbert L Starks
(74) *Attorney, Agent, or Firm* — Jay Wahlquist

(57) ABSTRACT

A database query comprising predicates may be received. Each predicate may operate on database columns. The database query may be determined to comprise strict operators. An upper bound neural network may be defined for calculating an adjacent upper bound and a lower bound neural network may be defined for calculating an adjacent lower bound. The upper bound neural network and the lower bound neural network may be trained using a selected value from data of a database table associated with the database query to be executed through the upper bound neural network and the lower bound neural network. The upper bound neural network and the lower bound neural network may be adjusted by passing in an expected value using an error found in expressions. The adjacent lower bound and the adjacent upper bound may be calculated in response to completion of initial training for the database columns.

13 Claims, 8 Drawing Sheets

(51) Int. Cl.
  *G06N 3/04* (2006.01)
  *G06F 16/2453* (2019.01)
  *G06N 5/00* (2006.01)

(52) U.S. Cl.
  CPC ............. *G06N 3/04* (2013.01); *G06N 3/0427* (2013.01); *G06N 3/0454* (2013.01); *G06N 3/0481* (2013.01); *G06N 5/003* (2013.01); *G06N 3/02* (2013.01)

(56) References Cited

U.S. PATENT DOCUMENTS

| | | |
|---|---|---|
| 6,272,487 B1 | 8/2001 | Beavin et al. |
| 6,738,755 B1 | 5/2004 | Freytag et al. |
| 6,865,567 B1 | 3/2005 | Oommen et al. |
| 7,512,629 B2 | 3/2009 | Haas et al. |
| 7,890,491 B1 | 2/2011 | Simmen |
| 7,958,113 B2 | 6/2011 | Fan et al. |
| 8,126,872 B2 | 2/2012 | Corvinelli et al. |
| 8,135,701 B2 | 3/2012 | Kutsch et al. |
| 8,386,450 B2 | 2/2013 | Simmen |
| 8,630,999 B2 | 1/2014 | Corvinelli et al. |
| 2003/0195881 A1 | 10/2003 | Koo et al. |
| 2004/0181521 A1 | 9/2004 | Simmen |
| 2008/0306903 A1 | 12/2008 | Larson et al. |
| 2011/0029507 A1 | 2/2011 | Au et al. |
| 2018/0174048 A1* | 6/2018 | Corvinelli ......... G06F 16/24545 |

OTHER PUBLICATIONS

Corvinelli et al., "Estimating Cardinality Selectivity Utilizing Artificial Neural Networks," U.S. Appl. No. 15/899,746, filed Feb. 20, 2018.

List of IBM Patents or Patent Applications Treated as Related, Feb. 13, 2018, 2 pgs.

Kwanglat, P. et al., "Query Transformation for Exact Cardinality Computing," ©2011 IEEE, pp. 514-518, Mar. 11-13, 2011.

Boulos et al., "Selectivity Estimation Using Neural Networks," CiteSeer Digital Library, Jun. 1998, p. 1-21.

Corvinelli et al., "Cardinality Estimation Using Artificial Neural Networks," Application and Drawings, filed Mar. 5, 2015, p. 1-39, U.S. Appl. No. 14/639,157.

Corvinelli et al., "Cardinality Estimation Using Artificial Neural Networks," Application and Drawings, filed Mar. 23, 2016, p. 1-35, U.S. Appl. No. 15/078,302.

Cybenko, "Approximation by Superpositions of a Sigmoidal Function," Mathematics of Control, Signals, and Systems, 1989, p. 303-314, vol. 2, Springer-Verlag New York Inc.

Getoor et al., "Selectivity Estimation using Probabilistic Models," SIGMOD '01, May 21-24, 2001, p. 461-472, ACM, Santa Barbara, California, USA.

Heimel et al., "A Bayesian Approach to Estimating the Selectivity of Conjunctive Predicates," Datenbanksysteme in Business, Technologie and Web (BTW), 2009, p. 47-56, Lecture Notes in Informatics, Gesellschaft für Informatik, Bonn.

IBM, "Statistical Views," IBM DB2 10.5 for Linux, UNIX, and Windows Documentation, p. 1-4, IBM Knowledge Center, http://www.ibm.com/support/knowledgecenter/api/content/nl/en-us/SSEPGG_10.5.0/com.ibm.db2.luw.admin.perf.doc/doc/c0021713.html, Accessed on May 3, 2016.

Kapoor et al., "Understand column group statistics in DB2," IBM developerWorks Technical Library, Dec. 21, 2006, p. 1-19, http://www.ibm.com/developerworks/data/library/techarticle/dm-0612kapoor/, Accessed on May 3, 2016.

Lakshmi et al., "Selectivity Estimation in Extensible Databases—A Neural Network Approach," Proceedings of the 24th VLDB Conference, 1998, p. 623-627, Very Large Data Base Endowment, New York, USA.

Liu et al., "Cardinality Estimation Using Neural Networks," Proceedings of the 25th Annual International Conference on Computer Science and Software Engineering (CASCON '15), Nov. 2-4, 2015, p. 53-59, Markham, Ontario, Canada, Grace Period Disclosure.

Markl et al., "Consistently Estimating the Selectivity of Conjuncts of Predicates," Proceedings of the 31st VLDB Conference, 2005, p. 373-384, Very Large Data Base Endowment, Trondheim, Norway.

Mell et al., "The NIST Definition of Cloud Computing," National Institute of Standards and Technology, Sep. 2011, p. 1-3, Special Publication 800-145.

Selmic et al., "Neural-Network Approximation of Piecewise Continuous Functions: Application to Friction Compensation," IEEE Transactions on Neural Networks, May 2002, p. 745-751, vol. 13, No. 3.

White, "Cardinality Estimation for Multiple Predicates," SQLPerformance.com, Jan. 15, 2014, p. 1-8, SQL Sentry, LLC, http://sqlperformance.com/2014/01/sql-plan/cardinality-estimation-for-multiple-predicates, Accessed on May 3, 2016.

* cited by examiner

US 10,706,354 B2

ESTIMATING CARDINALITY SELECTIVITY UTILIZING ARTIFICIAL NEURAL NETWORKS

STATEMENT REGARDING PRIOR DISCLOSURES BY THE INVENTOR OR A JOINT INVENTOR

Aspects of the present invention have been disclosed by the inventors in the paper "Cardinality Estimation Using Neural Networks", published in the Proceedings of the 25th Annual International Conference on Computer Science and Software Engineering (CASCON '15), made available to the public on Nov. 2, 2015. The following disclosure is submitted under 35 U.S.C. § 102(b)(1)(A).

BACKGROUND

The present invention relates generally to the field of data processing, and more particularly to query optimization.

Query optimization may be a function of many relational database management systems (DBMS). A query optimizer may attempt to determine an efficient way to execute a given database query by considering possible query plans. A query plan may be a strategic method to access data in a DBMS. Additionally, the query optimizer cannot be accessed directly by a user submitting the database query. Once a database query is submitted to a database server, and parsed by a parser, the database query may then be passed to the query optimizer where a query plan may be developed. Query optimization may be a process for retrieving data within a DBMS that is most closely related to the DBMS query.

SUMMARY

According to one exemplary embodiment, a processor-implemented method for an adjacent value estimator for a cardinality estimation using an artificial neural network. The method may include receiving a database query comprising one or more predicates, whereby each predicate in the one or more predicates operates on one or more database columns of a database. The method may further include determining the received database query comprises one or more strict operators. The method may further include defining an upper bound neural network for calculating an adjacent upper bound and a lower bound neural network for calculating an adjacent lower bound based on receiving a database query. The method may further include training the defined upper bound neural network and the defined lower bound neural network using a selected value from a plurality of data within a database table associated with the received database query to be executed through the defined upper bound neural network and the defined lower bound neural network. The method may further include adjusting the defined upper bound neural network and the defined lower bound neural network by inputting an expected value using an error found in one or more expressions based on training the defined upper bound neural network and the defined lower bound neural network. The method may further include calculating the adjacent lower bound and the adjacent upper bound for a particular database column based on adjusting the defined upper bound neural network and the defined lower bound neural network. The method may further include inputting the calculated adjacent lower bound and calculated adjacent upper bound into the artificial neural network. The method may further include estimating a selectivity for the one or more database columns in response to inputting the calculated adjacent lower bound and calculated adjacent upper bound into the artificial neural network. The method may further include inputting the calculated adjacent lower bound and calculated adjacent upper bound in a query optimization process based on estimating the selectivity for the one or more database columns. The method may further include modifying the received database query with a plurality of equivalent non-strict operations for approximate query processing.

According to another exemplary embodiment, a computer system for an adjacent value estimator for cardinality estimation using an artificial neural network is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving a database query comprising one or more predicates, whereby each predicate in the one or more predicates operates on one or more database columns of a database. The method may further include determining the received database query comprises one or more strict operators. The method may further include defining an upper bound neural network for calculating an adjacent upper bound and a lower bound neural network for calculating an adjacent lower bound based on receiving a database query. The method may further include training the defined upper bound neural network and the defined lower bound neural network using a selected value from a plurality of data within a database table associated with the received database query to be executed through the defined upper bound neural network and the defined lower bound neural network. The method may further include adjusting the defined upper bound neural network and the defined lower bound neural network by inputting an expected value using an error found in one or more expressions based on training the defined upper bound neural network and the defined lower bound neural network. The method may further include calculating the adjacent lower bound and the adjacent upper bound for a particular database column based on adjusting the defined upper bound neural network and the defined lower bound neural network. The method may further include inputting the calculated adjacent lower bound and calculated adjacent upper bound into the artificial neural network. The method may further include estimating a selectivity for the one or more database columns in response to inputting the calculated adjacent lower bound and calculated adjacent upper bound into the artificial neural network. The method may further include inputting the calculated adjacent lower bound and calculated adjacent upper bound in a query optimization process based on estimating the selectivity for the one or more database columns. The method may further include modifying the received database query with a plurality of equivalent non-strict operations for approximate query processing.

According to yet another exemplary embodiment, a computer program product for an adjacent value estimator for cardinality estimation using an artificial neural network is provided. The computer program product may include one or more computer-readable storage devices and program instructions stored on at least one of the one or more tangible storage devices, the program instructions executable by a processor. The computer program product may include program instructions to receive a database query comprising one or more predicates, whereby each predicate in the one or more predicates operates on one or more database columns of a database. The computer program product may further include program instructions to determine the received database query comprises one or more strict operators. The computer program product may further include program instructions to define an upper bound neural network for calculating an adjacent upper bound and a lower bound neural network for calculating an adjacent lower bound based on receiving a database query. The computer program product may further include program instructions to train the defined upper bound neural network and the defined lower bound neural network using a selected value from a plurality of data within a database table associated with the received database query to be executed through the defined upper bound neural network and the defined lower bound neural network. The computer program product may further include program instructions to adjust the defined upper bound neural network and the defined lower bound neural network by inputting an expected value using an error found in one or more expressions based on training the defined upper bound neural network and the defined lower bound neural network. The computer program product may further include program instructions to calculate the adjacent lower bound and the adjacent upper bound for a particular database column based on adjusting the defined upper bound neural network and the defined lower bound neural network. The computer program product may further include program instructions to input the calculated adjacent lower bound and calculated adjacent upper bound into the artificial neural network. The computer program product may further include program instructions to estimate a selectivity for the one or more database columns in response to inputting the calculated adjacent lower bound and calculated adjacent upper bound into the artificial neural network. The computer program product may further include program instructions to input the calculated adjacent lower bound and calculated adjacent upper bound in a query optimization process based on estimating the selectivity for the one or more database columns. The computer program product may further include program instructions to modify the received database query with a plurality of equivalent non-strict operations for approximate query processing.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
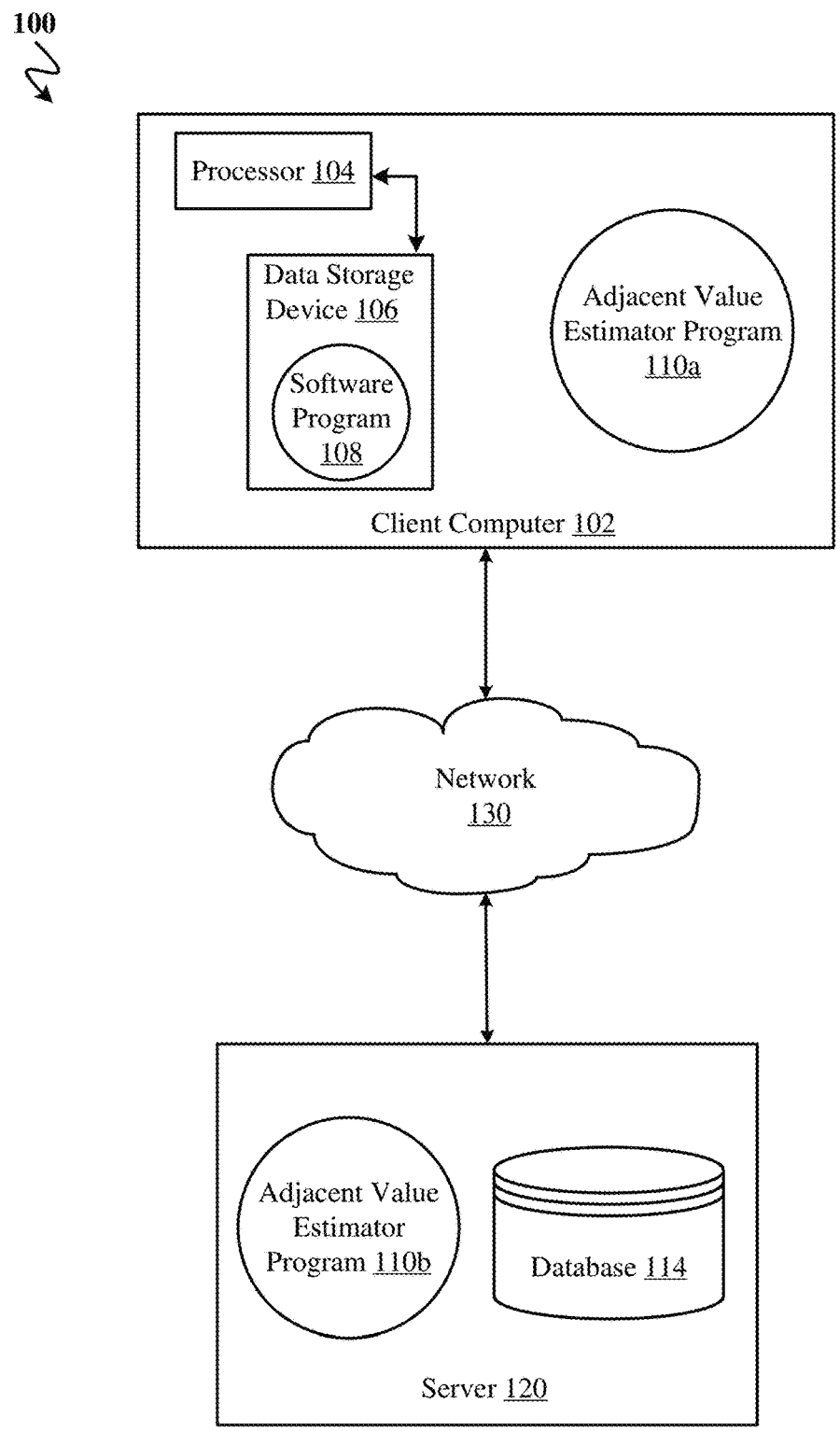
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects of the present disclosure relate to improving database management system (DBMS) query optimization. Hereinafter, a DBMS query may be referred to as a database query. More specifically, aspects of the present disclosure relate to improving an estimation of the number of qualified rows returned from a query. Hereinafter, the term cardinality is used to denote the number of qualified rows of a database table returned from a query. Additionally, reducing the cardinality of a query can reduce resource utilization in a DBMS. Furthermore, reducing the cardinality of a query can be accomplished by improving query optimization. A neural network may be utilized in order to improve query optimization by improving the accuracy of the estimated cardinality.

An index may be a data structure that may improve the speed of data retrieval operations on a database table by creating a key for a particular row or column in the database table. A database query optimizer may have a variety of access plans for each DBMS query. There may be a variety of access plans when the data in a database is not evenly distributed throughout the database columns and each plan may be an alternative method of retrieving the data. A database query optimizer may associate a cost to each access plan considered and may choose the access plan with a minimal cost. One of the key attributes to properly assessing the cost of each alternative access plan may be to estimate the cardinality of the stream at each stage in each particular access plan.

A predicate is an element of a database query that may express or imply a comparison operation. For example, a predicate can be an operational symbol, such as greater than (>), less than (<), greater than or equal to (>=), less than or equal to (<=), or equal to (=). Predicates may be used to reduce the scope of data retrieval that may be returned by the database query. For example, reducing the scope can include reducing the number of rows in a database table to search for particular data. Moreover, using predicates to reduce the scope of a database query can reduce the total amount of resources used by a computer.

The application of one or more predicates within a database query may reduce an output stream cardinality. Treating predicates independently may be common when computing the predicates filtering effect on the cardinality.

However, the predicates can be statistically correlated; therefore, the combined filtering effect of predicates may not be the product of individually filtering an upper bound and a lower bound within a database query. This is a common problem in the field of query optimization. Furthermore, to accurately estimate the cardinality when multiple predicates are applied, a database administrator (DBA) must determine the appropriate set of statistics to collect.

Therefore, it may be advantageous to, among other things, provide a system to estimate the selectivity of a database query utilizing one or more trained neural networks to reduce the search scope within one or more columns in a database according to a received database query.

The following described exemplary embodiments provide a system, method, and program product to reduce a scope of data retrieval for database queries. As such, the present embodiment has the capacity to improve the technical field of data processing by utilizing neural networks to improve database queries. More specifically, estimating an adjacent upper bound and an adjacent lower bound by inputting an upper bound to an upper bound neural network and a lower bound into a lower bound neural network.

Aspects of the present disclosure may improve estimating the cardinality of a database query by using artificial neural networks (ANNs) to learn functions representing the combined selectivity of multiple statistically correlated predicates of any non-subquery relational operation. User input may be provided to guide the learning stage. ANNs may be utilized to learn functions that may accurately estimate the selectivity of multiple statistically correlated predicates in order to improve the performance of database queries and to reduce the amount of input required by the user to achieve this accuracy in selectivity estimation. Aspects of the present disclosure may account for all relational operators (e.g., <, >, >=, <=, and =) used within a database query. Furthermore, using ANNs in relation to DBMS queries may be effective for multiple statistically correlated columns with data in any type distribution (e.g., non-uniform distribution). Utilizing ANNs to improve database query optimization may reduce a need for user input to achieve the improved accuracy in the cardinality estimates. Furthermore, utilizing ANNs significantly reduces the amount of statistics that need to be collected from data and data location within a particular database. Moreover, utilizing ANNs to improve database query optimization may use a dynamic feedback approach to automatically adapt the ANN estimates as the database changes (e.g., adding data to the database). Utilizing ANNs to improve database query optimization may require little disk space for storage.

The result of a database query may be sufficient if approximated. Hereinafter, an approximated query result can be referred to as approximate query processing (AQP). For simplicity, in the following example, a database column may be referred to as COL and a first column in a database may be referred to as COL1. Additionally, a value within a database column (e.g., COL1) may be referred to as val and val9 may refer to a value of nine. Predicates COL1>val9 and COL2=val100 may be used to delimit the end ranges of an index with a key including a first column and a second column (COL1, COL2):

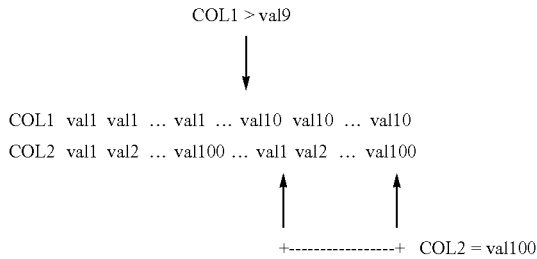

Transforming COL1>val9 to COL1>=val10, where val10 is the value adjacent to val9 (i.e. val9+), allows for a reduction in the range of values that needs to be accessed in column one of the database:

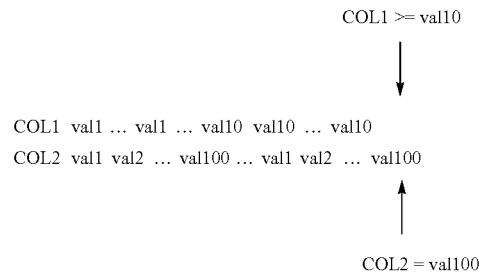

This replacement of a strict range operation (>) with a non-strict range operation (>=) reduces the resources required to process the query and the result may be sufficient for the purposes of AQP.

Herein, a range predicate may be a conjunction of two Boolean terms with the strict range operators (e.g., operators > and <) applied on the same database column. For example, the range predicate can take the form of col>=i and col<=u, where i is a lower bound and u is an upper bound of a particular range that may exist in a database column and where col is a particular column within a database. Moreover, the expression may be database search query to search a particular column of a database starting from the lower bound (i.e., i) and ending at the upper bound (i.e., u). Neural network architecture may assume that predicates only contain non-strict range operators, (e.g., operators >= and <=). From these two operators, an equality operator may derived by the equivalence: col=x ⇔ x<=col<=x. However, an approach to utilize expressions that include strict range operators is described herein. A solution to extend the use of neural network to any relational operator (e.g., strict-range operators) is provided.

To extend the functionality of the neural network to other relational operators, the following equivalence: i<col< u ⇔ $i^+$<=col<=$u^-$ may be utilized, where $i^+$ represents the smallest value greater than the lower bound i and where $u^-$ represents the largest value smaller than the upper bound u, where i and u are values within a particular database column. A database query containing predicates with strict operators may be rewritten into a database query containing only predicates with non-strict operators, given a mechanism for finding $i^+$ and $u^-$ for any value of any column in a database table. Therefore, all relational operators may be handled when training neural networks. Instead of keeping an index on every database column, which becomes inefficient for larger tables, accurately estimating $i^+$ and $u^-$ may be accomplished via neural networks. An augmented neural network may be applied to the lower bound and the upper bound for each column of the database table. For example, the lower bound (i.e., i) may be input to a lower bound neural network to estimate an adjacent lower bound (i.e., $i^+$). Additionally, the upper bound (i.e., u) may be input to an upper bound neural network to estimate an adjacent upper bound (i.e., $u^-$). These additional neural networks (i.e., the lower bound neural network and the upper bound neural network) may be referred to as a set of estimators, and they may be trained simultaneously with a main neural network by using set values from a training query generator. An adjacent value estimator program may produce an estimate for $i^+$ and $u^-$ for each column using the lower bound neural network and the upper bound neural network.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an adjacent value estimator program 110a. The networked computer environment 100 may also include a server 120 that is enabled to run an adjacent value estimator program 110b that may interact with a database 114 and a communication network 130. The networked computer environment 100 may include a plurality of computers 102 and servers 120, only one of which is shown. The communication network 130 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 120 via the communications network 130. The communications network 130 may include connections, such as wire, wireless communication links, or fiber optic cables. As will be discussed with reference to FIG. 6, server computer 120 may include internal components 902a and external components 904a, respectively, and client computer 102 may include internal components 902b and external components 904b, respectively. Server computer 120 may also operate in a cloud computing service model, such as Software as a Service (SaaS), Platform as a Service (PaaS), or Infrastructure as a Service (IaaS). Server 120 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the adjacent value estimator program 110a, 110b may interact with a database 114 that may be embedded in various storage devices, such as, but not limited to a computer/mobile device 102, a networked server 120, or a cloud storage service.

According to the present embodiment, a user using a client computer 102 or a server computer 120 may use the adjacent value estimator program 110a, 110b (respectively) to improve database query optimization by using neural networks to estimate an adjacent lower bound and an adjacent upper bound to improve the cardinality estimate of a DBMS query and for reducing resources for AQP. The adjacent value estimation method is explained in more detail below with respect to FIGS. 2-5.

Figure 2:
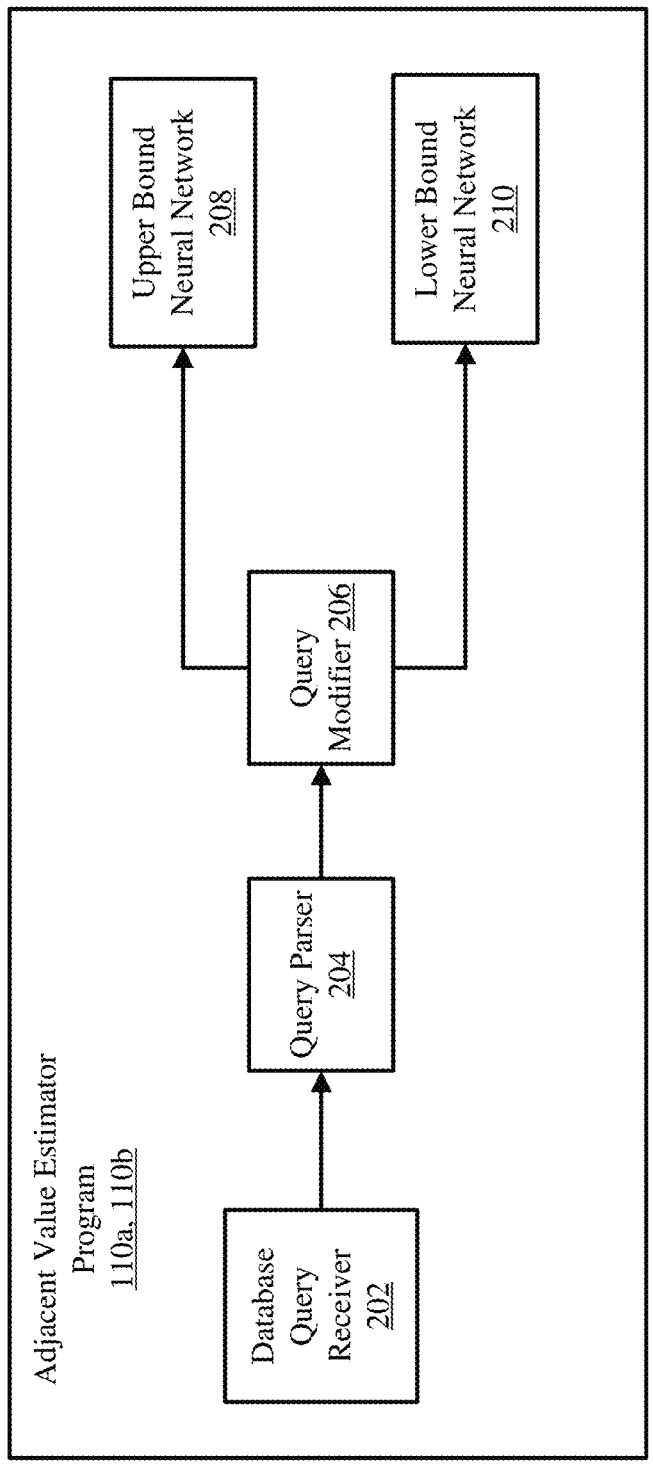
FIG. 2 is a functional block diagram of an adjacent value estimator program, according to at least one embodiment.

Referring now to FIG. 2, a functional block diagram of an adjacent value estimator program 110a, 110b is depicted, in accordance with one embodiment of the present invention. The adjacent value estimator program 110a, 110b may include a database query receiver 202, a query parser 204, a query modifier 206, an upper bound neural network 208, and a lower bound neural network 210.

The database query receiver 202 may be a program (e.g., software program 108 (FIG. 1)) capable of receiving a database query sent by a user or a client computer (e.g., 102 (FIG. 1)). The database query receiver 202 may be capable of processing various types of database queries (e.g., a DBMS query, a relational database query, or any type of query associated with retrieving data from a database). The database query may be expressed in structured query language (SQL), C++, or another programming language. The database query received by the database query receiver 202 may include one or more predicates that contain one or more operators that may operate on one or more database columns. For example, a database query for retrieving data from a column col of a database (e.g., 114 (FIG. 1)) starting from a lower bound i within column x of database t and ending at an upper bound u within the column x of database t can be in the form of i<t.colx>u. The predicates of the example database query may be the < relational operators. Moreover, the database query may include only range predicates with one or more strict operators (e.g., <, >).

The query parser 204 may be a program capable of analyzing the database query into logical syntactic components. For example, the query parser 204 may identify the < operators, the lower bound i, the upper bound u, and/or the column colx. Furthermore, the query parser may determine whether the database query conforms to the rules of a particular programming language associated with the database (e.g., SQL). Additionally, the query parser may recognize strict operators (e.g., <, >) within the database query that may need to be replaced by non-strict operators (e.g., <=, >=).

The query modifier 206 may be a program capable of modifying a database query by replacing strict operators with non-strict operators. The strict range operators (e.g., < or >) may be expressed in terms of a non-strict range operator (e.g., =< or >=) according to the following expression: i<t.colx<u ⇐ ⇒ i<=t.colx<=u, where i is a lower bound and u is an upper bound in column x of a database table t. For example, the query modifier 206 may replace the strict < operator with the non-strict <= operator. Additionally, the query modifier 20 may replace the > strict operator with the >= non-strict operator. As an additional example, the query modifier 206 may transform the database query i<t.colx<u received by the database query receiver 202 to a form of the database query i<=t.colx<=u. Transforming the database query may improve the performance of AQP by starting data retrieval within a particular column of the database (e.g., 114 (FIG. 1)) at a larger numbered value and by ending data retrieval within the database at a lower numbered value, thereby reducing the scope of the database search. Furthermore, computing resource expenditure may be reduced by narrowing the scope of the database search.

The upper bound neural network 208 may be an ANN capable of estimating an adjacent upper bound (i.e., $u^-$) that is the largest value less than the upper bound u within the column x. For example, if upper bound u is the upper bound of a column in a database query (e.g., i<t.colx<u), then adjacent upper bound u⁻ may be the largest value within column x less than upper bound u. For example, if there are ten values in a column x of a database table (e.g., value one, . . . , value ten) and the upper bound is value ten, then the adjacent upper bound would be value nine. Furthermore, in reference to a relational database where data may not be distributed evenly within each column, the upper bound neural network 208 may replace an upper bound within a particular column with the largest value less than the upper bound within the particular column or the value most related to the database query.

The upper bound neural network 208 may have artificial neurons grouped into one or more layers: an input layer, a hidden layer, and an output layer that will be discussed in FIG. 3A. An artificial neuron may be a mathematical function conceived as a model of biological neurons. Artificial neurons may be units in an artificial neural network. The upper bound neural network 208 may have appropriate weights computed for each neuron that resides within the hidden layer. Furthermore, the upper bound neural network 208 may be trained according to training data derived from metadata related to known column data distribution statistical methods. The column data distribution statistics may be statistics of how the data is distributed throughout the database table and how data is distributed within each column of the database table. Furthermore, the upper bound neural network 208 may have been trained by testing database queries including predicates for which the resulting cardinalities are known. Moreover, the upper bound neural network 208 may have been trained by executing test queries with various predicates to determine known resulting cardinalities for the training data. Training the upper bound neural network 208 may improve an approximation of estimating the adjacent upper bound u⁻.

The lower bound neural network 210 may be an ANN capable of estimating an adjacent lower bound that is the smallest value greater than the lower bound. For example, if lower bound i is the lower bound of a particular column x in database query (e.g., i<t.colx<u), then lower bound i⁺ may be the smallest value greater than lower bound i. For example, if there are ten values within a particular column x in a database table t (e.g., value one, . . . , value ten) and the lower bound value may be value one, then the adjacent lower bound value would be value two. Furthermore, in reference to a relational database where data may not be distributed evenly within each column, the lower bound neural network 210 may replace a lower bound value within a particular column with the smallest value greater than the lower bound value within the particular column.

The lower bound neural network 210 may have neurons grouped into one or more layers: an input layer, a hidden layer, and an output layer that will be discussed in FIG. 3B. An artificial neuron may be a mathematical function conceived as a model of biological neurons. Artificial neurons may be units in an artificial neural network. The lower bound neural network 210 may have appropriate weights computed for each neuron that resides within the hidden layer. Furthermore, the lower bound neural network 210 may be trained according to training data derived from metadata related to known column data distribution statistical methods. The column data distribution statistics may be statistics of how the data is distributed throughout the database table and how data is distributed within each column of the database table. Furthermore, the lower bound neural network 210 may have been trained by testing queries including predicates for which the resulting cardinalities are known. Moreover, the lower bound neural network 210 may have been trained by executing test queries with various predicates to determine known resulting cardinalities for the training data. Training the lower bound neural network 210 may improve an approximation of estimating the adjacent lower bound i⁺.

Figure 3A:
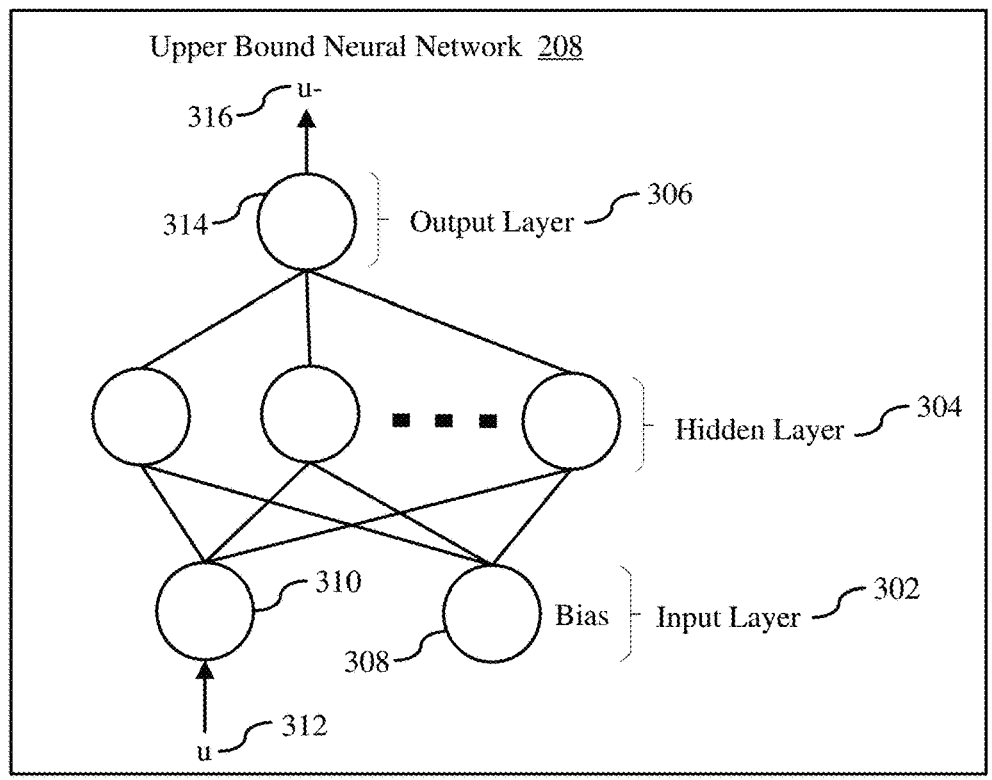
FIG. 3A is a functional block diagram of an upper bound neural network, according to at least one embodiment.

Referring now to FIG. 3A, a functional block diagram of an upper bound neural network 208 is depicted, in accordance with one embodiment of the present invention. The upper bound neural network 208 may be a feedforward neural network where connections between the three layers of grouped neurons (i.e. the input layer 302, the hidden layer 304, and the output layer 306) do not form a cycle (i.e., no looping connections). For example, each output from each neuron in the hidden layer 304 is the input for each neuron in the output layer 306 and do not loop back around for input to hidden layer 304 or to input layer 302.

The input layer 302 may include a bias 308 and an upper bound 310 as inputs. The bias 308 may be a value of one since the bias 308 may not have an input. The upper bound u 312 may be inputted to the upper bound 310. Additionally, the upper bound u 312 may be included in a database query within a value of a relational database column that exists in a column of a database table. The upper bound 310 may be inputted into each neuron of the hidden layer 304. Each neuron of the hidden layer 304 may apply a weight to the upper bound 310 according to a jump activation function. The jump activation function may be defined as:

$$\varphi_k(x) = \begin{cases} 0 & \text{for } x < 0 \\ (1 - e^{-x})^k & \text{for } x \geq 0 \end{cases},$$

where x is a value computed from one or more inputs to each neuron in the hidden layer 304 and k is a positive integer. Furthermore, each weight applied to each neuron may depend on training data.

Hidden layer 304 may include neurons that may not be observable from hidden layer's 304 inputs or outputs. Neurons in the hidden layer 304 are grouped by the jump activation function that each neuron may compute. The jump activation function may apply a weight to each neuron within the hidden layer 304. The weight may be in the form of a non-linear function that may depend on the training data, discussed in FIG. 2. Each neuron within the hidden layer 304 may be fully connected to the input layer 302 (i.e., each neuron in the hidden layer 304 takes as input bias 308 and upper bound 310 within the input layer 302).

Similar to each neuron in the input layer 302 being connected to each neuron in the hidden layer 304, the output layer 306 may be connected to every neuron in the hidden layer 304. The output layer 306 may include neuron 314 that may output adjacent upper bound u⁻ 316. Adjacent upper bound u⁻ 316 may be the largest value within a particular column that is less than the upper bound u 312. The adjacent upper bound u⁻ 316 may be calculated by the upper bound neural network 208. The calculation of adjacent upper bound u⁻ 316 by the upper bound neural network 208 may enable the database query containing strict range operators including upper bound u 312 to be converted to a non-strict range operator including adjacent upper bound u⁻ 316.

Figure 3B:
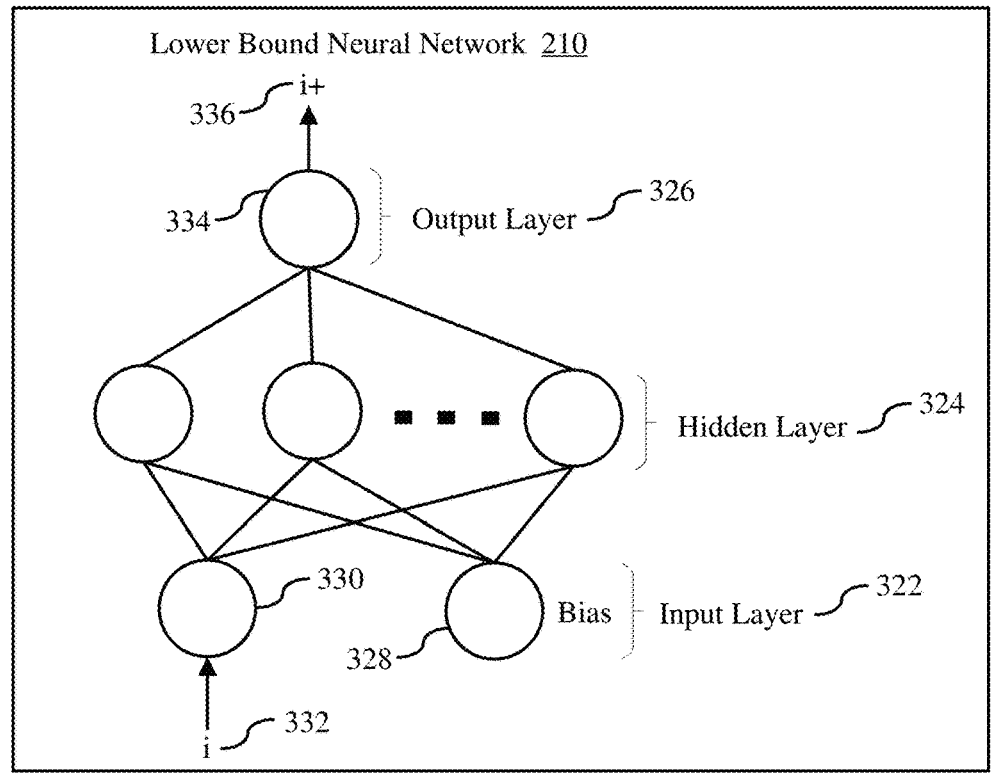
FIG. 3B is a functional block diagram of a lower bound neural network, according to at least one embodiment.

Referring now to FIG. 3B, a functional block diagram of a lower bound neural network 210 is depicted in more detail, in accordance with one embodiment of the present invention. Lower bound neural network 210 is a feedforward neural network where connections between the layers, 322-

326 do not form a cycle. For example, each output from each neuron in the hidden layer 324 is the input for each neuron in the output layer 326 and may not loop back around for input to hidden layer 324 or to input layer 322. The lower bound neural network 210 may include three layers of grouped neurons (nodes): input layer 322, hidden layer 324, and output layer 326.

The input layer 322 may include a bias 328 and a lower bound 330 as input. The bias 328 may be a value of one since the bias 328 may not have an input. The lower bound i 332 may be inputted to the lower bound 330. Additionally, the lower bound i 332 may be included in a database query within a value of a relational database column that exists in a column of a database table. The lower bound i 332 may be inputted into each neuron of the hidden layer 324. Each neuron of the hidden layer 324 may apply a weight to the lower bound i 332 according to the jump activation function. Furthermore, each weight applied to each neuron may depend on the training data.

Hidden layer 324 may include neurons that are not observable from its inputs or outputs. Neurons in the hidden layer 324 may be grouped by the jump activation function that they may compute. The jump activation function can apply a weight to each neuron within the hidden layer 324. The weight may be in the form of a non-linear function that may depend on the training data, discussed in FIG. 2. Each neuron within the hidden layer 324 is fully connected to the input layer 322 (i.e., each neuron in the hidden layer 324 takes as input 328 and lower bound 330 within the input layer 322).

Similar to each neuron in the input layer 322 being connected to each neuron in the hidden layer 324, the output layer 326 may be connected to every neuron in the hidden layer 324. The output layer 326 may include neuron 334 that may output the adjacent lower bound $i^+$ 336. Adjacent lower bound $i^+$ 336 may be the smallest value within a particular column that is larger than the lower bound i 332. The adjacent lower bound $i^+$ 336 may be calculated by the lower bound neural network 210. The calculation of adjacent lower bound $i^+$ 336 by the lower bound neural network 210 may enable the database query containing strict range operators including lower bound i 332 to be converted to a non-strict range operator including adjacent lower bound $i^+$ 336.

Figure 4:
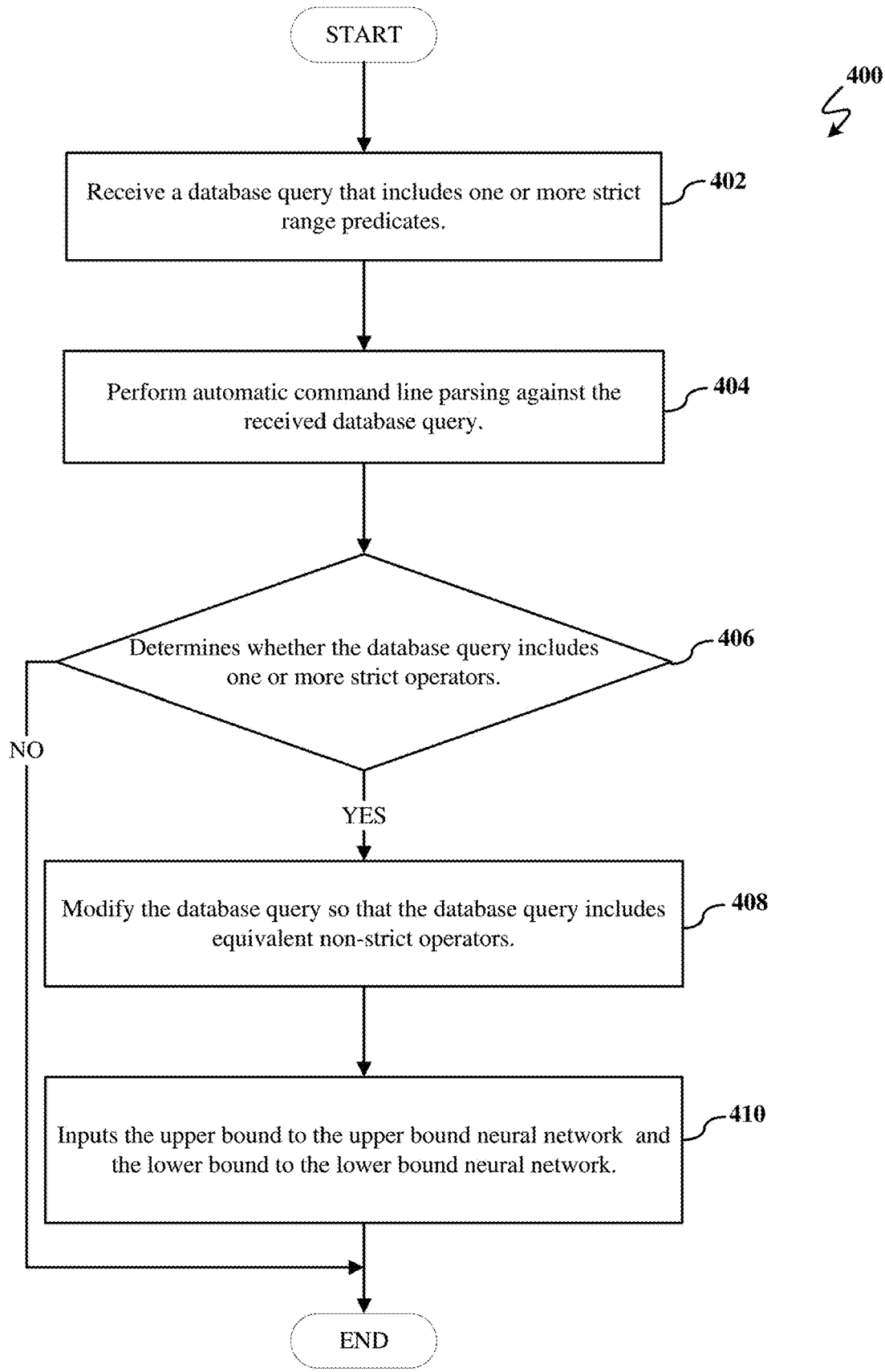
FIG. 4 is an operational flowchart illustrating a query optimization process according to at least one embodiment.

Referring now to FIG. 4, an operational flowchart illustrating a query optimization process 400 according to at least one embodiment is depicted. At 402, the adjacent value estimator program 110a, 110b (FIG. 1) receives a database query that includes one or more strict range predicates by the database query receiver 202 (FIG. 2). The one or more strict range predicates of the database query may be in the form of i=t.colx=u, where lower bound i 332 (FIG. 3B) may be a lower bound for searching within column x of database t and upper bound u 312 (FIG. 3A) may be an upper bound for searching within column x of database t. The strict range predicate (e.g., <) may be operating on the lower bound i 332 (FIG. 3B) and upper bound u 312 (FIG. 3A) of column x of database t. A database manager may create a variety of access plans, where each access plan may vary for retrieving data from the database.

Next, at 404, the adjacent value estimator program 110a, 110b (FIG. 1) performs automatic command line parsing against the received database query by the query parser 204 (FIG. 2). The query parser 204 (FIG. 2) may be a software component that takes the database query and builds a data structure that gives a structural representation of the input and checks for correct syntax in the process. The query parser 204 (FIG. 2) may analyze a string of symbols (e.g., a database query) that conforms to the rules of a programming language (e.g., SQL). The input data can be database queries in one or more programming languages. However, the input data can also be database queries in natural language or less structured textual data. A particular program of query parsing (e.g., query parser 204 (FIG. 2)) can perform a function using regular expressions (e.g., a sequence of characters that define a search pattern), where a regular expression defines a regular language, and automatically generate a parser for that language, allowing pattern matching and extraction of text within the received database query. Additionally, the adjacent value estimator program 110a, 110b (FIG. 1) may identify the strict range operators (e.g., < and >) within the database query.

Then, at 406, the adjacent value estimator program 110a, 110b (FIG. 1) determines whether the database query includes one or more strict operators. According to at least one embodiment, the query optimization process 400 may continue along the operational flowchart if the database query includes one or more strict operators. The adjacent value estimator program 110a, 110b (FIG. 1) can determine whether the database query includes one or more strict operators by the query parser 204 (FIG. 2) performing automatic command line parsing on the database query and then comparing operators within the database query to a known list of operators within the database 114 (FIG. 1). If the adjacent value estimator program 110a, 110b (FIG. 1) determines that the database query includes one or more strict operators (step 406, "YES" branch), the query optimization process 400 may continue to modify the database query so that the database query includes equivalent non-strict operators at step 408. If the adjacent value estimator program 110a, 110b (FIG. 1) determines the database query does not include one or more strict operators (step 406, "NO" branch), the query optimization process 400 may terminate.

At 408, the adjacent value estimator program 110a, 110b (FIG. 1) modifies the database query so that the database query includes equivalent non-strict operators (e.g., =<, >=) by the query modifier 206 (FIG. 2). For example, the query modifier 206 (FIG. 2) may replace the strict operators within the database query with equivalent non-strict operators. For example, the query modifier 206 (FIG. 2) may apply the following equivalence to the database query:

$$i\text{=}t.colx\text{=}u \Longleftrightarrow i^+\text{<=}t.colx\text{<=}u^-$$

Next, at 410, the adjacent value estimator program 110a, 110b (FIG. 1) inputs the upper bound u 312 (FIG. 3A) to the upper bound neural network 208 (FIG. 2) and the lower bound i 332 (FIG. 3B) to the lower bound neural network 210 (FIG. 2). The upper bound neural network 208 (FIG. 2) and the lower bound neural network 210 (FIG. 2) may be initialized, then trained using training data prior to receiving the input upper bound u 312 (FIG. 3A) and the lower bound i 332 (FIG. 3B), respectively, as will be discussed in more detail in FIG. 5. The output from the upper bound neural network 208 (FIG. 2) may be the adjacent upper bound $u^-$ 316 (FIG. 3A) and output from the lower bound neural network 210 (FIG. 2) may be the adjacent lower bound $i^+$ 336 (FIG. 3B). Both the adjacent upper bound $u^-$ 316 (FIG. 3A) and the adjacent lower bound $i^+$ 336 (FIG. 3B) may be input to a main neural network to estimate the selectivity of a particular column for a database table.

Figure 5:
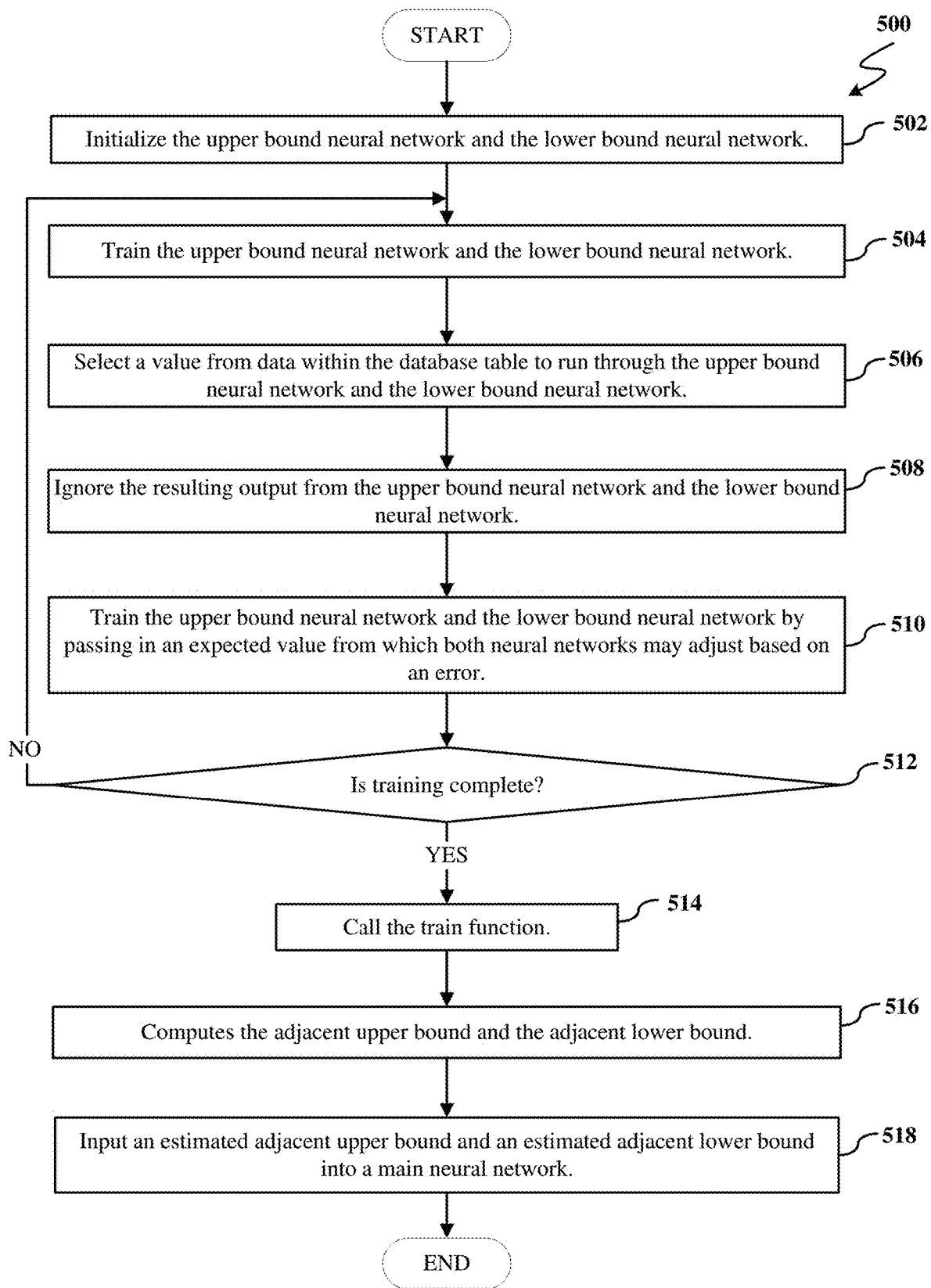
FIG. 5 is an operational flowchart illustrating an adjacent lower bound and an adjacent upper bound calculation process according to at least one embodiment.

Referring now to FIG. 5, an operational flowchart illustrating an adjacent lower bound and an adjacent upper bound calculation process 500 according to at least one embodiment is depicted. The following depicted algorithm maybe translated to any programming language (e.g., C++, SQL, etc . . . ). Aspects of the present disclosure may be implemented according to the following algorithm:

```
BEGIN
    FOR each column Ci
        NN_plus_i = InitializeNeuralNetwork( );
        NN_minus_i = InitializeNeuralNetwork( );
        WHILE CONTINUE_TRAINING(NN_plus_i, NN_minus_i)
        DO
            Xi = Ci->PickRandomValue( );
            Xi+ = Ci->NextValue(X);
            Xi- = Ci->PreviousValue(X);
            Xi+_estimate = NN_plus_i->Run(Xi);
            Xi-_estimate = NN_minus_i->Run(Xi);
            NN_plus_i->Train(Xi+);
            NN_minus_i->Train(Xi-);
        END
END
```

At 502, the adjacent value estimator program 110a, 110b (FIG. 1) initializes the upper bound neural network 208 (FIG. 2) and the lower bound neural network 210 (FIG. 2). The adjacent value estimator program 110a, 110b (FIG. 1) may initialize the upper bound neural network 208 (FIG. 2) and the lower bound neural network 210 (FIG. 2) according to the following section of an algorithm:
BEGIN
FOR each column Ci
NN_plus_i=InitializeNeuralNetwork( );
NN_minus_i=InitializeNeuralNetwork( );
Where NN_plus_i represents the neural network to estimate x+ for column Ci and NN_minus_i represents the neural network to estimate x− for column Ci.

Next, at 504, the adjacent value estimator program 110a, 110b (FIG. 1) trains the upper bound neural network 208 (FIG. 2) and the lower bound neural network 210 (FIG. 2) by a preconfigured training algorithm. Training the upper bound neural network 208 (FIG. 2) and the lower bound neural network 210 (FIG. 2) may be accomplished by known statistical methods. Furthermore, the known statistical methods may rely on how the data is statistically distributed throughout the database. Additionally, the adjacent value estimator program 110a, 110b (FIG. 1) may train the upper bound neural network 208 (FIG. 2) and the lower bound neural network 210 (FIG. 2) according to the following section of the algorithm:
WHILE CONTINUE_TRAINING(NN_plus_i, NN_minus_i)
DO Then, at 506, the adjacent value estimator program 110a, 110b (FIG. 1) selects a value from data within the database table to run through the upper bound neural network 208 (FIG. 2) and the lower bound neural network 210 (FIG. 2) by a preconfigured algorithm. For simplicity, a user-selected known search technique for training may be used. Furthermore, the adjacent value estimator program 110a, 110b (FIG. 1) may select a value from the data within the database table and run through the upper bound neural network 208 (FIG. 2) and the lower bound neural network 210 (FIG. 2) according to the following section of the algorithm:
Xi=Ci->PickRandomValue( );
Xi+=Ci->NextValue(X);
Xi-=Ci-<PrevoiusValue(X);
Where Xi may be a user-selected value from a group of values, Xi+ may be a next user-selected value from the group of values, and Xi− may be a previous user-selected value from the group of values.

At 508, the adjacent value estimator program 110a, 110b (FIG. 1) ignores the resulting output from the upper bound neural network 208 (FIG. 2) and the lower bound neural network 210 (FIG. 2) from step 506 by the preconfigured algorithm. The first iteration through the two neural networks initiates the next iteration in training required by step 510. Moreover, the adjacent value estimator program 110a, 110b (FIG. 1) ignores the resulting output from the upper bound neural network 208 (FIG. 2) and the lower bound neural network 210 (FIG. 2) from step 506 according to the following section of the algorithm:
Xi+_estimate=NN_plus_i->Run(Xi);
Xi-_estimate=NN_minus_i->Run(Xi);

Next, at 510, the adjacent value estimator program 110a, 110b (FIG. 1) continues to train the upper bound neural network 208 (FIG. 2) and the lower bound neural network 210 (FIG. 2) by passing in an expected value from which upper bound neural network 208 (FIG. 2) and lower bound neural network 210 (FIG. 2) may each adjust based on an error. The error may be determined based on a comparison of an output (e.g., adjacent upper bound u⁻ 316 (FIG. 3A) and adjacent lower bound i⁺ 336 (FIG. 3B)) to an expected result. The adjacent value estimator program 110a, 110b (FIG. 1) continues to train the upper bound neural network 208 (FIG. 2) and the lower bound neural network 210 (FIG. 2) by passing in an expected value from which upper bound neural network 208 (FIG. 2) and lower bound neural network 210 (FIG. 2) may each adjust based on an error according to the following section of the algorithm:
NN_plus_i->Train(Xi+);
NN_minus_i->Train(Xi-);
END Then, at 512, the adjacent value estimator program 110a, 110b (FIG. 1) determines whether the initial training is complete. Training may be determined to be completed when a threshold is reached (e.g., when the error is below a numerical value). According to at least one embodiment, the adjacent lower bound and adjacent upper bound calculation process 500 may continue along the operational flowchart if the initial training is complete. If the adjacent value estimator program 110a, 110b (FIG. 1) determines that the initial training is complete (step 512, "YES" branch), the adjacent lower bound and adjacent upper bound calculation process 500 may continue to call the train function at step 514. If the adjacent value estimator program 110a, 110b (FIG. 1) program determines the initial training is not complete (step 512, "NO" branch), the adjacent lower bound and adjacent upper bound calculation process 500 may return to step 504 to train the lower bound neural network 210 (FIG. 2) and the upper bound neural network 208 (FIG. 2).

Training may be an iterative process where a sample of data taken from a database is run through a neural network (e.g., upper bound neural network 208 (FIG. 2) and lower bound neural network 210 (FIG. 2)) and the neural network may be self-adjusted by comparing an output (e.g., adjacent upper bound u⁻ 316 (FIG. 3A) and adjacent lower bound i⁺ 336 (FIG. 3B)) to an expected result. A simple implementation of training may be to iterate the training a fixed number of times, N, which can be in the 100s to 10000s of iterations. Also, training can be performed multiple times to produce multiple neural networks, of which one neural network may be selected according to a comparison of the output from the neural network to the expected result.

Next, at step 516, the adjacent value estimator program 110a, 110b (FIG. 1) computes the adjacent upper bound and the adjacent lower bound. The adjacent value estimator program 110a, 110b (FIG. 1) computes the adjacent upper bound ui⁻ 316 (FIG. 3A)) and the adjacent lower bound li⁺ 336 (FIG. 3B)) by inputting adjacent upper bound u⁻ 316 (FIG. 3A) and adjacent lower bound i⁺ 336 (FIG. 3B) into the upper bound neural network 208 (FIG. 2) and the lower bound neural network 210 (FIG. 2). Furthermore, the adjacent value estimator program 110a, 110b (FIG. 1) computes the adjacent upper bound and the adjacent lower bound according to the following section of the algorithm:
li⁺=NN_plus_i->Run(li);
ui⁻=NN_minus_i->Run(ui);

Then, at step 518, the adjacent value estimator program 110a, 110b (FIG. 1) inputs an estimated adjacent upper bound ui⁻ (i.e., u⁻ 316 (FIG. 3A)) and an estimated adjacent lower bound (i.e., i⁺ 336 (FIG. 3B)) into a main neural network. The main neural network may output an estimation of a selectivity of a particular column of a particular database between the adjacent upper bound ui⁻ (i.e., u⁻ 316 (FIG. 3A)) and the adjacent lower bound li⁺ (i.e., i⁺ 336 (FIG. 3B)) according to the following section of the algorithm:
selectivity=NN_sel->Run(ui⁻, li⁺);
END It may be appreciated that FIGS. 2-5 provide only an illustration of one embodiment and do not imply any limitations with regard to how different embodiments may be implemented. Many modifications to the depicted embodiment(s) may be made based on design and implementation requirements.

Figure 6:
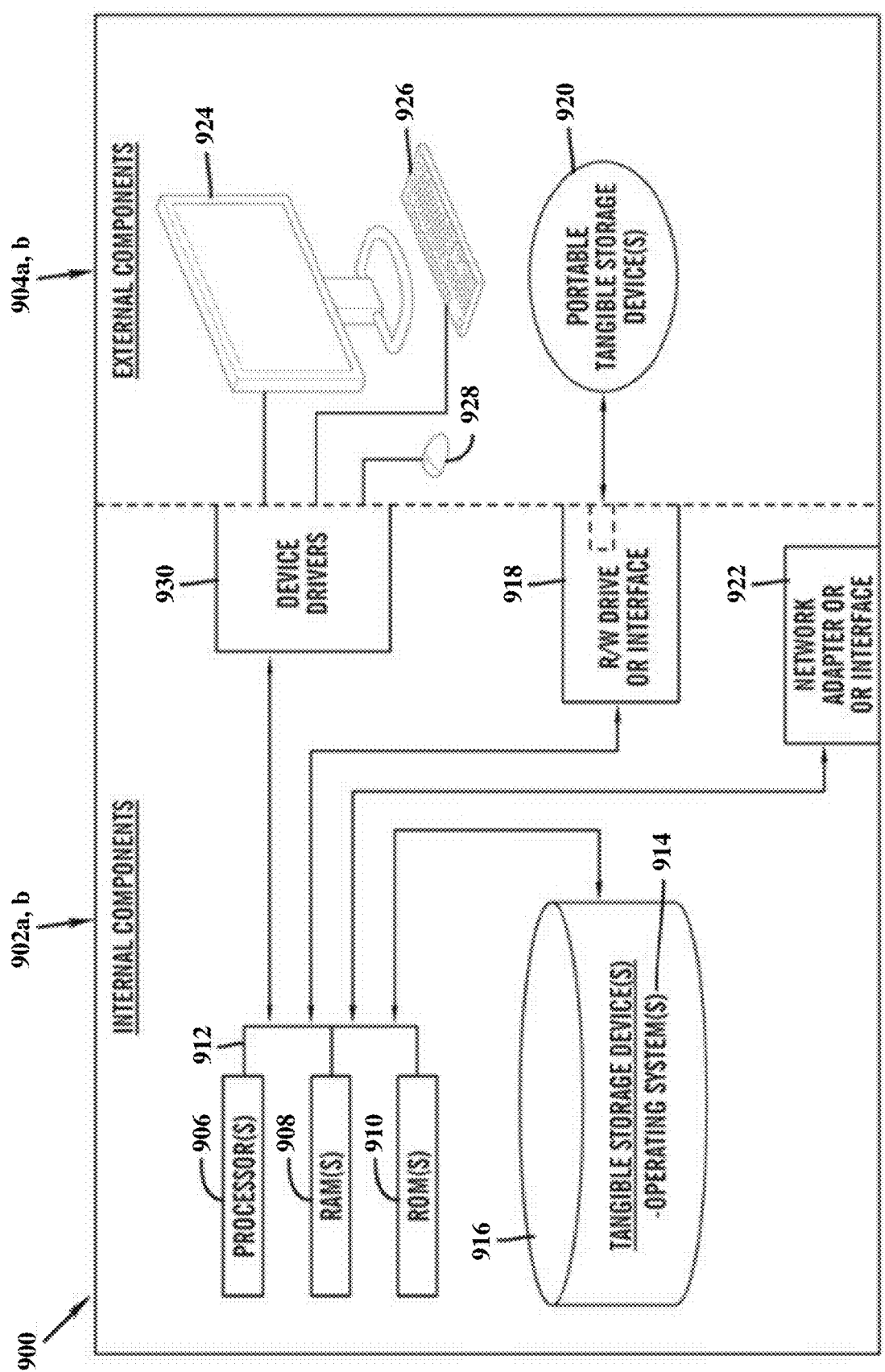
FIG. 6 is a block diagram of internal and external components of computers and servers depicted in FIG. 1 according to at least one embodiment.

FIG. 6 is a block diagram 900 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 120 (FIG. 1) may include respective sets of internal components 902 a, b and external components 904 a, b illustrated in FIG. 6. Each of the sets of internal components 902 a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914 and the software program 108 (FIG. 1) and the adjacent value estimator program 110a (FIG. 1) in client computer 102 (FIG. 1) and the adjacent value estimator program 110b (FIG. 1) in network server 120 (FIG. 1) may be stored on one or more computer-readable tangible storage devices 916 for execution by one or more processors 906 via one or more RAMs 908 (which typically include cache memory). In the embodiment illustrated in FIG. 6, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 (FIG. 1) and the adjacent value estimator program 110a, 110b (FIG. 1), can be stored on one or more of the respective portable computer-readable tangible storage devices 920, read via the respective R/W drive or interface 918, and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 (FIG. 1) and the adjacent value estimator program 110a (FIG. 1) in client computer 102 (FIG. 1) and the adjacent value estimator program 110b (FIG. 1) in network server computer 120 (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the software program 108 (FIG. 1) and the adjacent value estimator program 110a (FIG. 1) in client computer 102 (FIG. 1) and the adjacent value estimator program 110b (FIG. 1) in network server computer 120 (FIG. 1) are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
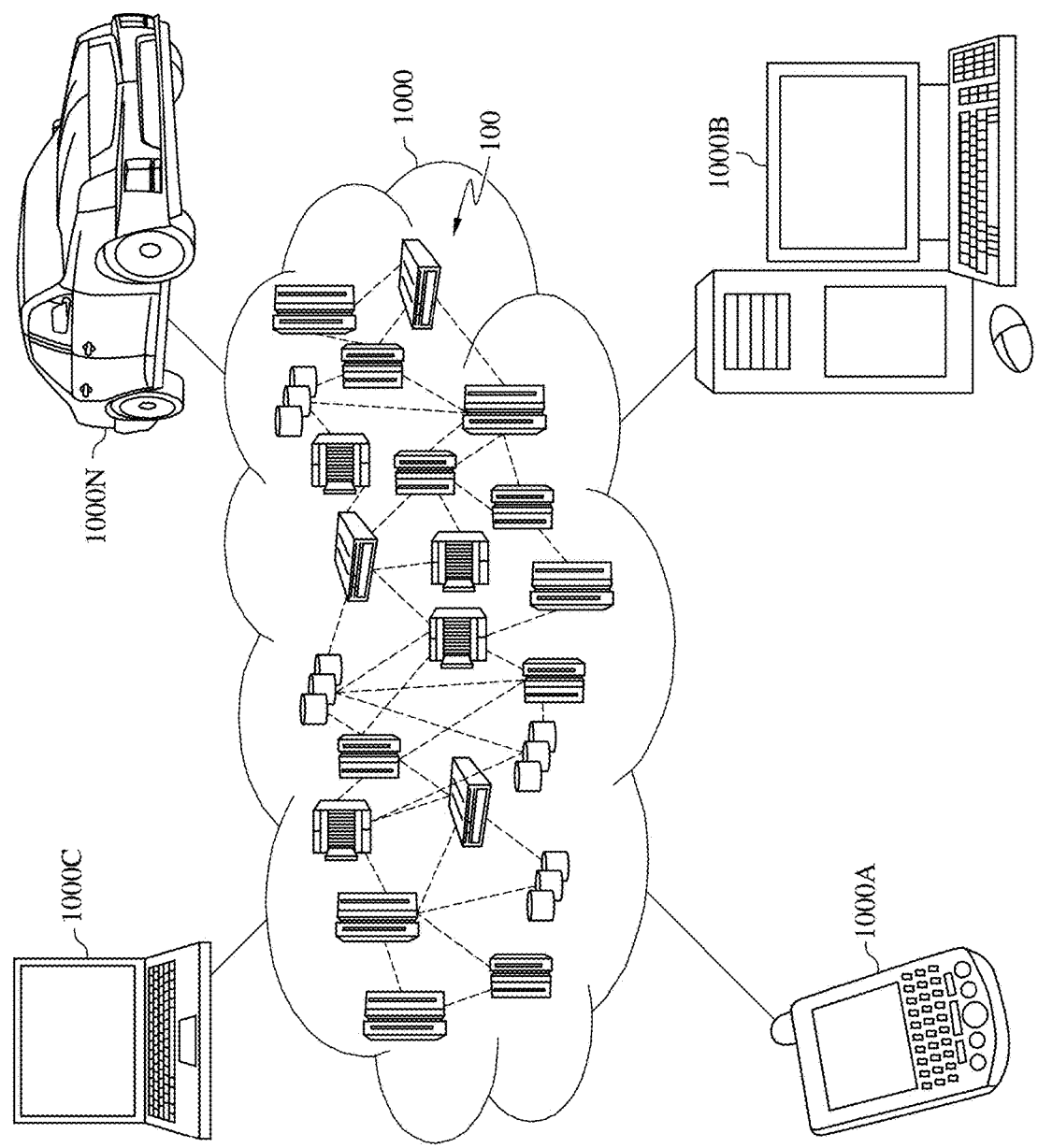
FIG. 7 is a block diagram of an illustrative cloud computing environment including the computer system depicted in FIG. 1, in accordance with an embodiment of the present disclosure.

Referring now to FIG. 7, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 7 are intended to be illustrative only and that computing nodes 100 and cloud computing environment 1000 can communicate with any type of computerized device over any type of network and/or network addressable connection (e.g., using a web browser).

Figure 8:
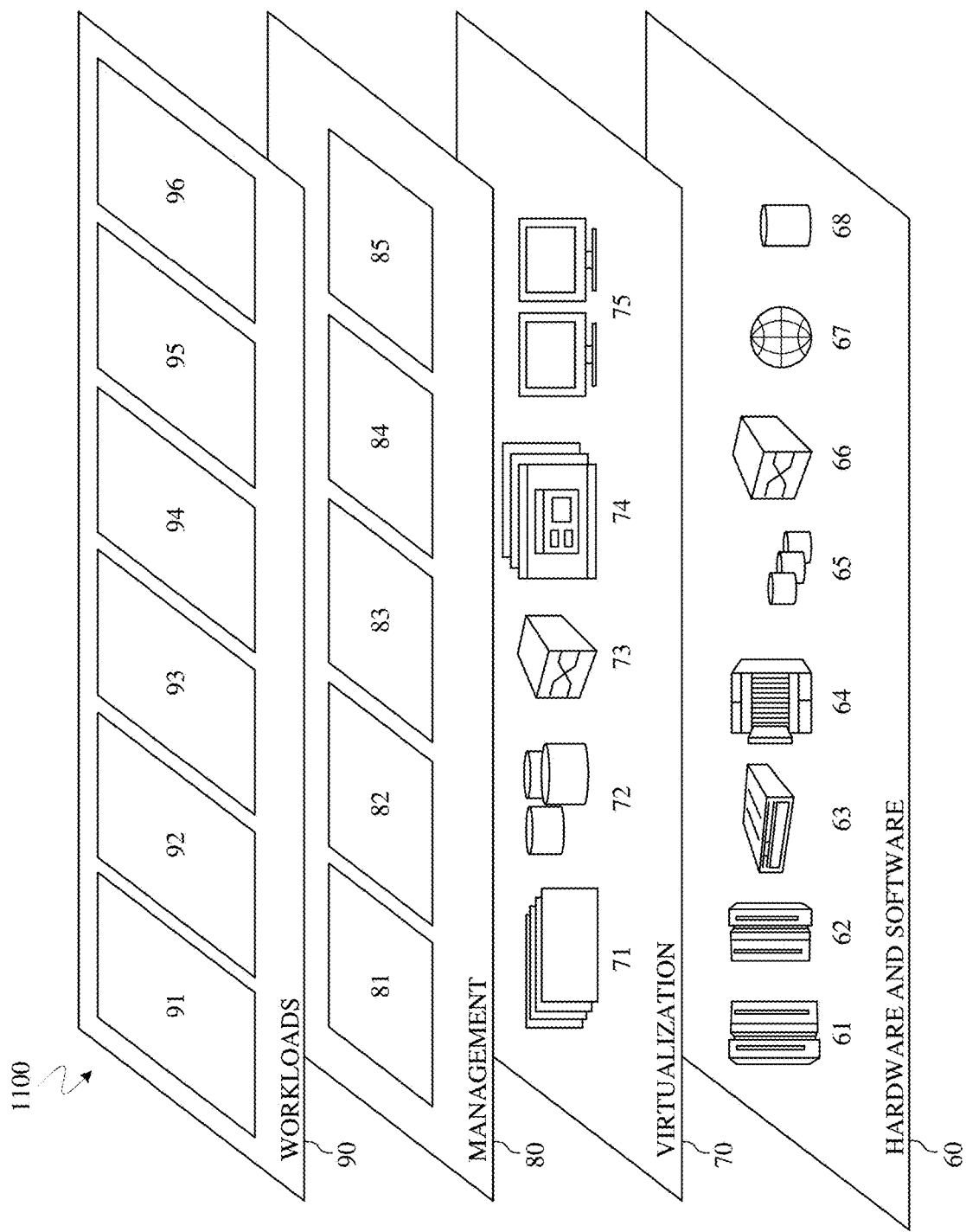
FIG. 8 is a block diagram of functional layers of the illustrative cloud computing environment of FIG. 7, in accordance with an embodiment of the present disclosure.

Referring now to FIG. 8, a set of functional abstraction layers 1100 provided by cloud computing environment 1000 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and adjacent value estimation 96. Adjacent value estimation 96 provides a way to improve database queries by an adjacent value estimator program 110a, 110b (FIG. 1) utilizing neural networks to estimate an adjacent upper bound and an adjacent lower bound in order to reduce the scope of data retrieval within a particular column of the database.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for an adjacent value estimator for cardinality estimation using an artificial neural network, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving a database query comprising one or more predicates, wherein each predicate in the one or more predicates operates on one or more database columns of a database;
determining the received database query comprises one or more strict operators;
defining an upper bound neural network for calculating an adjacent upper bound and a lower bound neural network for calculating an adjacent lower bound based on receiving a database query;
training the defined upper bound neural network and the defined lower bound neural network using a selected value from a plurality of data within a database table associated with the received database query to be executed through the defined upper bound neural network and the defined lower bound neural network;
adjusting the defined upper bound neural network and the defined lower bound neural network by inputting an expected value using an error found in one or more expressions based on training the defined upper bound neural network and the defined lower bound neural network;
calculating the adjacent lower bound and the adjacent upper bound for a particular database column based on adjusting the defined upper bound neural network and the defined lower bound neural network;
inputting the calculated adjacent lower bound and calculated adjacent upper bound into the artificial neural network;
estimating a selectivity for the one or more database columns in response to inputting the calculated adjacent lower bound and calculated adjacent upper bound into the artificial neural network;
inputting the calculated adjacent lower bound and calculated adjacent upper bound in a query optimization process based on estimating the selectivity for the one or more database columns; and
modifying the received database query with a plurality of equivalent non-strict operations for approximate query processing.

2. The computer system of claim 1, wherein cardinality denotes a number of qualified rows associated with a stream at each stage in an access plan, and wherein the artificial neural network has a plurality of layers and comprises a plurality of neurons in a hidden layer within the plurality of layers grouped by a jump activation function, and wherein each neuron within the plurality of neurons is fully connected to an input layer within the plurality of layers enabling each neuron in the hidden layer within the plurality of layers to take a plurality of input neurons as input, and wherein an output layer within the plurality of layers is connected to each neuron in the hidden layer.

3. The computer system of claim 2, wherein the jump activation function is defined as $$\varphi_k(x) = \begin{cases} 0 & \text{for } x < 0 \\ (1-e^{-x})^k & \text{for } x \geq 0 \end{cases},$$

and wherein x is a value computed from one or more inputs to each neuron in the hidden layer and k is a positive integer.

4. The computer system of claim 1, wherein the database query is modified according to an expression $i < col < u \Longleftrightarrow i^+ \leq col \leq u^-$, wherein $i^+$ denotes a smallest value greater than i in a respective column of the database, and wherein $u^-$ denotes a largest value smaller than u in the respective column of the database.

5. The computer system of claim 1, wherein the adjacent lower bound and the adjacent upper bound are inputted to a non-strict range predicate selectivity artificial neural network to estimate a selectivity estimation of a range predicate.

6. The computer system of claim 1, wherein the database is a relational database including one or more rows and the one or more database columns.

7. The computer system of claim 1, wherein the database is inputted into a processor by a client computing device, and wherein the estimated selectivity is received by the client computing device.

8. A computer program product for an adjacent value estimator for cardinality estimation using an artificial neural network, comprising:
one or more computer-readable storage medium and program instructions stored on at least one of the one or more tangible storage medium, the program instructions executable by a processor, the program instructions comprising:

program instructions to receive a database query comprising one or more predicates, wherein each predicate in the one or more predicates operates on one or more database columns of a database;

program instructions to determine the received database query comprises one or more strict operators;

program instructions to define an upper bound neural network for calculating an adjacent upper bound and a lower bound neural network for calculating an adjacent lower bound based on receiving a database query;

program instructions to train the defined upper bound neural network and the defined lower bound neural network using a selected value from a plurality of data within a database table associated with the received database query to be executed through the defined upper bound neural network and the defined lower bound neural network;

program instructions to adjust the defined upper bound neural network and the defined lower bound neural network by inputting an expected value using an error found in one or more expressions based on training the defined upper bound neural network and the defined lower bound neural network;

program instructions to calculate the adjacent lower bound and the adjacent upper bound for a particular database column based on adjusting the defined upper bound neural network and the defined lower bound neural network;

program instructions to input the calculated adjacent lower bound and calculated adjacent upper bound into the artificial neural network;

program instructions to estimate a selectivity for the one or more database columns in response to inputting the calculated adjacent lower bound and calculated adjacent upper bound into the artificial neural network;

program instructions to input the calculated adjacent lower bound and calculated adjacent upper bound in a query optimization process based on estimating the selectivity for the one or more database columns; and program instructions to modify the received database query with a plurality of equivalent non-strict operations for approximate query processing.

9. The computer program product of claim 8, wherein cardinality denotes a number of qualified rows associated with a stream at each stage in an access plan, and wherein the artificial neural network has a plurality of layers and comprises a plurality of neurons in a hidden layer within the plurality of layers grouped by a jump activation function, and wherein each neuron within the plurality of neurons is fully connected to an input layer within the plurality of layers enabling each neuron in the hidden layer within the plurality of layers to take a plurality of input neurons as input, and wherein an output layer within the plurality of layers is connected to each neuron in the hidden layer.

10. The computer program product of claim 9, wherein the jump activation function is defined as $$\varphi_k(x) = \begin{cases} 0 & \text{for } x < 0 \\ (1 - e^{-x})^k & \text{for } x \geq 0 \end{cases},$$

and wherein x is a value computed from one or more inputs to each neuron in the hidden layer and k is a positive integer.

11. The computer program product of claim 8, wherein the database query is modified according to an expression $i<col<u \Longleftrightarrow i^+ \leq col \leq u^-$, wherein $i^+$ denotes a smallest value greater than i in a respective column of the database, and wherein $u^-$ denotes a largest value smaller than u in the respective column of the database.

12. The computer program product of claim 8, wherein the adjacent lower bound and the adjacent upper bound are inputted to a non-strict range predicate selectivity artificial neural network to estimate a selectivity estimation of a range predicate.

13. The computer program product of claim 8, wherein the database is a relational database including one or more rows and the one or more database columns.

* * * * *